US006795873B1

(12) United States Patent
Barth et al.

(10) Patent No.: US 6,795,873 B1
(45) Date of Patent: Sep. 21, 2004

(54) METHOD AND APPARATUS FOR A SCHEDULING DRIVER TO IMPLEMENT A PROTOCOL UTILIZING TIME ESTIMATES FOR USE WITH A DEVICE THAT DOES NOT GENERATE INTERRUPTS

(75) Inventors: David M. Barth, Portland, OR (US); Brian D. Nelson, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 09/607,256

(22) Filed: Jun. 30, 2000

(51) Int. Cl.$^7$ ............................................... G06F 3/00
(52) U.S. Cl. .............................. 710/15; 710/5; 710/10; 710/17; 710/18; 710/31; 710/58; 714/5; 714/47; 711/219
(58) Field of Search ......................... 711/219; 710/110, 710/307, 5, 39, 65, 15, 45, 7, 10, 17, 18, 19, 31, 32, 33, 36, 58; 714/5, 47

(56) References Cited

U.S. PATENT DOCUMENTS

| | | | | | |
|---|---|---|---|---|---|
| 5,579,447 | A | * | 11/1996 | Salgado | 358/1.9 |
| 6,128,672 | A | * | 10/2000 | Lindsley | 710/19 |
| 6,213,652 | B1 | * | 4/2001 | Suzuki et al. | 358/1.15 |
| 6,292,856 | B1 | * | 9/2001 | Marcotte | 710/39 |
| 6,438,704 | B1 | * | 8/2002 | Harris et al. | 713/502 |
| 6,467,054 | B1 | * | 10/2002 | Lenny | 714/42 |
| 6,549,934 | B1 | * | 4/2003 | Peterson et al. | 709/203 |

FOREIGN PATENT DOCUMENTS

| | | | |
|---|---|---|---|
| EP | 0 714 058 A1 | 5/1996 | |
| EP | 0 964 333 A1 | 12/1999 | |
| JP | 01067630 A | * 3/1989 | G06F/9/46 |
| JP | 04153837 A | * 5/1992 | G06F/9/46 |
| JP | 05035701 A | * 2/1993 | G06F/15/16 |

OTHER PUBLICATIONS

Timur Friedman & Don Towsley; Multicast Session Membership Size Estimation; www–net.cs.umass.edu; IEEE 1999.

* cited by examiner

Primary Examiner—Fritz Fleming
Assistant Examiner—Angel L. Casiano
(74) Attorney, Agent, or Firm—Joni D. Stutman-Horn

(57) ABSTRACT

The present invention provides a method and apparatus for a scheduling driver to implement a protocol using time estimates for use with a device that does not generate interrupts. An application calls the scheduling driver to start an Input/Output (I/O) request to a device. The scheduling driver determines if the device is busy. If the device is not busy, the scheduling driver provides an estimated processing time (EPT) for the I/O request to be completed to the application. In one embodiment, if the device is busy, the scheduling driver calculates an estimated amount of time left (EATL) until the device will be available to the application and provides this EATL to the application. When the device is not busy, the application sleeps for the estimated processing time (EPT) and calls the scheduling driver to obtain the I/O operation results. If the I/O request has been completed, the scheduling driver provides the I/O operation results to the application. However, if the I/O request has not been completed, the scheduling driver calculates an estimated processing time remaining (EPTR) for the I/O request to be completed and provides the EPTR to the application. The application then sleeps for the estimated processing time remaining (EPTR) and again calls the scheduling driver to obtain the I/O operation results. These operations can be repeated until the I/O request has been completed.

77 Claims, 4 Drawing Sheets

METHOD AND APPARATUS FOR A SCHEDULING DRIVER TO IMPLEMENT A PROTOCOL UTILIZING TIME ESTIMATES FOR USE WITH A DEVICE THAT DOES NOT GENERATE INTERRUPTS

BACKGROUND

1. Field of the Invention

This invention relates to computers. In particular, the invention relates to a scheduling driver to implement a protocol using time estimates for use with a device that does not generate interrupts.

2. Description of Related Art

Generally, a driver is a program that controls a device. Every device, such as a printer, disk drive, or keyboard, needs to have a driver to be operable with a computer. Many drivers, such as keyboard driver, come with an operating system. For other devices, a driver needs to be loaded when the device is connected to the computer. A driver acts like a translator between the device and the applications that use the device. Each device has its own set of specialized commands that only its driver knows. In contrast, most applications access devices by using generic commands. The driver, therefore, accepts generic commands from an application and translates them into specialized commands for the device.

Most device drivers handle hardware requests using the following sequence of steps:

1. Initiate a hardware request or put it in a queue if the device is already busy.
2. When the device generates an interrupt, the current request has been completed. At this point, return the results of the request to the application and initiate the next request in the queue.

Typically, each application uses a synchronous call to execute its request. The operating system (O/S) returns control to the application when the driver completes the request, which happens when the device generates an interrupt.

However, a problem arises when dealing with slow devices that do not generate interrupts. Unfortunately, most drivers utilized with a device that does not generate an interrupt do not have mechanisms to fairly share access among competing applications to the device and tend to utilize Central Processing Unit (CPU) processing time inefficiently in accommodating the competing applications. For example, some drivers utilized with these types of devices poll device registers to determine I/O completion. Unfortunately, with these types of drivers, the application often pauses or stalls execution to wait for the completion of the Input/Output (I/O) request during device processing, or executes an excessive number of I/O requests, both of which unnecessarily waste CPU processing time.

BRIEF DESCRIPTION OF THE DRAWINGS

The features and advantages of the present invention will become apparent from the following description of the present invention in which.

DESCRIPTION

The present invention provides a method and apparatus for a scheduling driver to implement a protocol using time estimates for use with a device that does not generate interrupts. An application calls the scheduling driver to start an Input/Output (I/O) request to a device. The scheduling driver determines if the device is busy. If the device is not busy, the scheduling driver initiates the I/O request to the device and provides an estimated processing time (EPT) for the I/O request to be completed to the application.

In one embodiment, if the device is busy, the scheduling driver calculates an estimated amount of time left (EATL) until the device will be available to the application and provides this EATL to the application. When the device is not busy, the application sleeps for the estimated processing time (EPT) and calls the scheduling driver to obtain the I/O operation results. If the I/O request has been completed, the scheduling driver provides the I/O operation results to the application.

However, if the I/O request has not been completed, the scheduling driver calculates an estimated processing time remaining (EPTR) for the I/O request to be completed and provides the EPTR to the application. The application then sleeps for the estimated processing time remaining (EPTR) and again calls the scheduling driver to obtain the I/O operation results. These operations can be repeated until the I/O request has been completed.

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures and circuits, are shown in block diagram form in order not to obscure the present invention.

Figure 1:
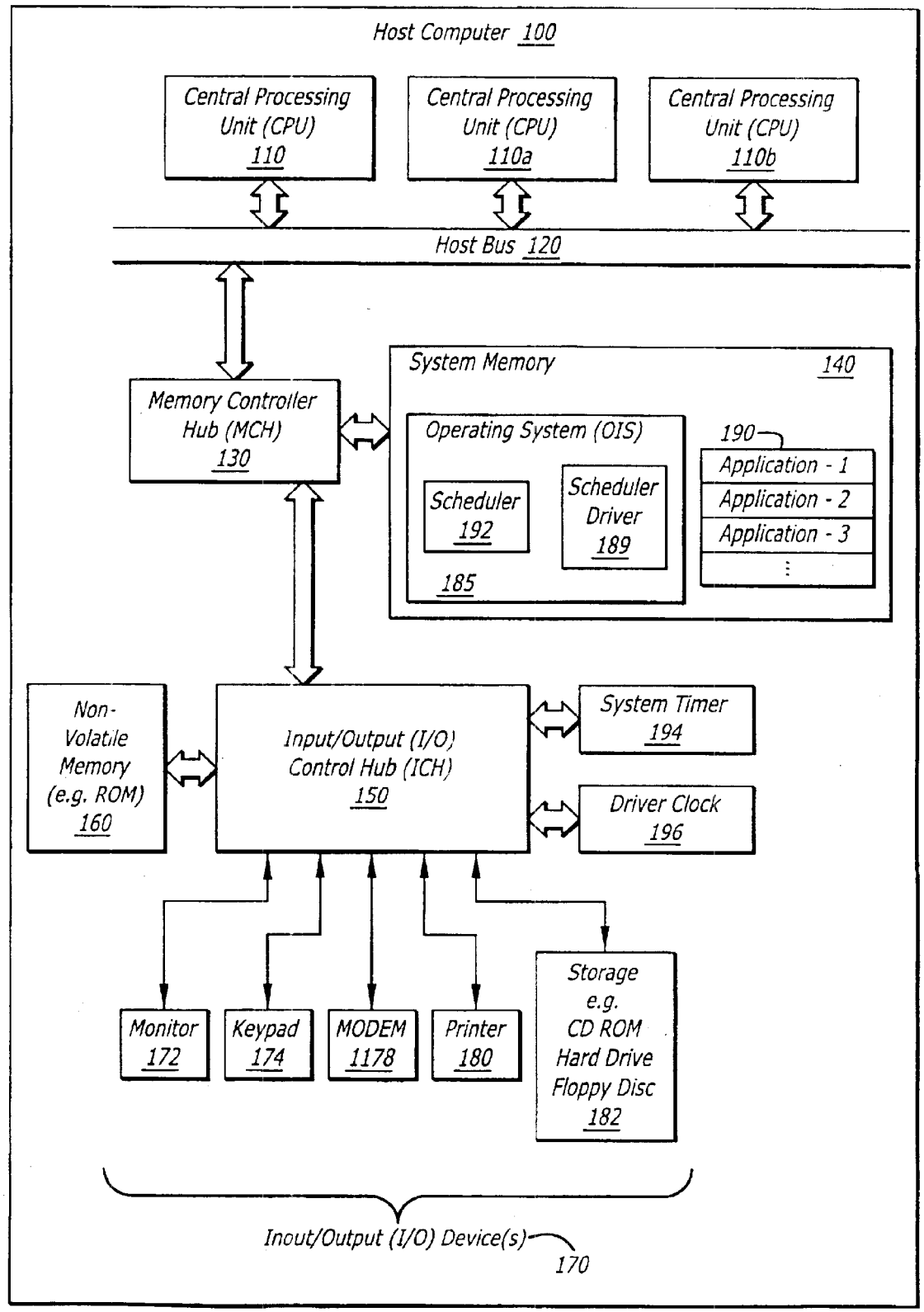
FIG. 1 is a diagram illustrating an exemplary computer system environment in which one embodiment of the invention can be practiced.

FIG. 1 is a diagram illustrating an exemplary computer system environment in which one embodiment of the present invention can be practiced. The present invention can be implemented in a host computer 100. The host computer 100 can include at least one central processing unit (CPU) I/O, a host bus 120, a memory controller hub (MCH) 130, a system memory 140, an input/output controller hub (ICH) 150, a non-volatile memory, or system flash memory, 160, and at least one input/output (I/O) device 170. The I/O devices 170 can include a monitor 172, a keypad 174, a modem 178, a printer 180, and storage devices 182 (e.g. CD Rom, hard drive, floppy drive, etc.), as well as any other type of I/O device.

The MCH 130 may be integrated into a chipset that integrates multiple functionalities such as memory control and host-to-peripheral bus interface. Similarly, the ICH 150 may also be integrated into a chipset together or separate from the MCH 130 to perform I/O functions. For clarity, not all the peripheral buses are shown. It is contemplated that the host computer 100 may also include peripheral buses such as Peripheral Component Interconnect (PCI), accelerated graphics port (AGP), Industry Standard Architecture (ISA) bus, and Universal Serial Bus (USB), etc.

The CPU 110 represents a central processing unit of any type of architecture, such as complex instruction set computers (CISC), reduced instruction set computers (RISC), very long instruction word (VLIW), or hybrid architecture. In one embodiment, the CPU is compatible with an Intel Architecture (IA) processor, such as the Pentium™ series, the IA-32™ and the IA-64™. In one embodiment, the host computer 100 can be a single processor system, such as a desktop computer, which has only one main central processing unit, e.g. processor 110. In other embodiments, the host computer 100 can include multiple processors, e.g. processors 110, 110*a*, 110*b*, etc. Thus, the host computer 100 can be a multi-processor computer system having any number of processors. For example, the multi-processor host computer 100 can operate as part of a server or workstation environment. The basic description and operation of processor 110 will be discussed in detail below. It will be appreciated by those skilled in the art that the basic description and operation of processor 110 applies to the other processors 110*a* and 110*b*, as well as any number of other processors that may be utilized in the multi-processor host computer 100 according to one embodiment of the present invention.

The host bus 120 provides interface signals to allow the processor 110, or processors 110, 110*a*, and 110*b*, to communicate with other processors or devices, e.g., the MCH 130. The MCH 130 provides control and configuration of memory and input/output devices such as the system memory 140 and the ICH 150. The system memory 140 stores system code and data such as an operating system 185, a scheduling driver 189, and applications 190. The system memory 140 can be implemented with dynamic random access memory (DRAM) or static random access memory (SRAM). The ICH 150 performs traditional I/O functions to control I/O device(s) 170

The I/O devices 170 may include any I/O devices to perform I/O functions. The I/O devices 170 can include a monitor 172, a keypad 174, a modem 178, a printer 180, and storage devices 182 (e.g. CD Rom, hard drive, floppy drive, etc.) or any other types of I/O devices, e.g., controllers for input devices (mouse, trackball, pointing device), media cards (e.g., audio, video, graphics), network cards, and any other peripheral controllers. Typically, an I/O device 170 can be defined as a discrete item of physical hardware that can be electrically coupled to the host computer 100 such that software running on a host CPU 110 can change the device's physical or electrical state using defined instruction sequences. When an I/O device 170 is electrically coupled to the host computer 100, it is termed as being connected to the host computer.

Device Input/Output (I/O) is a process by which a defined sequence of machine instructions causes the host CPU 110 to alter the physical or electrical state of the connected I/O device 170 using electrical (typically digital) signals. An I/O request is an electrical signal generated by a host CPU that produces an atomic physical or electrical state change in the I/O device. Typically, an I/O request is initiated at the point in time when a host CPU produces a signal that causes an atomic device state change and is completed at the point in time when a device has finished changing states in response to a signal from a host CPU. During the period of time between when an I/O request is initiated and when it is completed, the I/O device is processing the request.

The processing time of an I/O request is the duration of the time period between when an I/O request is initiated and when it is completed. A particular request's processing time depends on the time required for the I/O device 170 to completely effect the requested state change. For some requests, processing time is deterministic. Processing times for these requests can be determined with a high degree of accuracy given only the request type and parameters. For some requests, processing time is non-deterministic. Precise processing times for these requests cannot be determined solely from the request type and parameters. This typically means that processing time from one such request to another varies randomly or in proportion to one or more environmental factors. Processing time estimates can be made with varying degrees of accuracy, depending on the nature of the request.

When an I/O 170 is busy, I/O requests cannot be initiated because the device is already processing its maximum number of simultaneous requests. The maximum number of simultaneous requests for most I/O devices is 1. Such devices are busy whenever they are processing any request. Some devices can process two or more requests at the same time. These devices can handle the initiation of a new request while processing other requests. Such devices typically impose limitations on the kinds of requests that can be processed while processing other requests. Such devices typically impose limitations on the kinds of requests that can be processed simultaneously. Thus, whether or not a device is busy can depend on the nature of the desired request.

The system memory 140 stores system code and data such as an operating system 185, at least one driver such as the scheduling driver 189, and applications 190. The operating system 185 is a collection of software components that provides for basic system operation. The operating system 185 manages creating, destroying and scheduling process contexts, as well as loading software components in response to user requests. The operating system 185 manages process contexts, as well as, loading software components in response to user requests. The operating system manages process contexts to create the illusion of an arbitrary number of active software components running simultaneously on a single host computer 100 with a limited number of CPUs 110 (e.g. 1). Its components are often restricted to using a small subset of system features.

The scheduling driver 189, according to one embodiment of the present invention, is a software component designed primarily to perform device I/O on behalf of other software components, including the operating system 185 and the applications 190. The scheduling driver 189 functions as part of the operating system. Particularly, the present invention provides a method and apparatus for the scheduling driver 189 to implement a protocol using time estimates such that the scheduling device driver is useable with a device that does not generate interrupts. Only one scheduling device driver 189 is shown in FIG. 1, however, it should be appreciated that there can be any number of scheduling device drivers 189 depending upon how many I/O devices 170 are present.

Typically, device drivers run at a high CPU privilege level so they can have access to the features needed to initiate I/O requests. Device drivers need to cooperate carefully with the operating system in order to maintain system stability and performance. Since the driver functions as part of the operating system, many system features are not available to driver code. On some operating systems device drivers can be active components, but on most operating systems device drivers are passive components such as the scheduling driver 189 according to one embodiment of the present invention. Pieces of driver code that produce I/O requests often run in the process context of whatever application requested the device I/O. Device drivers exist in order to allow applications to be written without specific knowledge of how to use various devices. Instead, the application uses a defined set of calls into the operating system to accomplish device I/O. This architecture allows different drivers to be used to interface to different devices without requiring the application to explicitly support each type of available device.

The applications 190 are software programs (e.g. word processors, databases, games, etc.) which are used by the host computer 100, and as will be discussed, need to utilize a device driver for I/O processing. Generally, an application 190 is any software component that is not part of the core operating system 185. Applications typically do not interact directly with devices 170. Instead, they request I/O by calling operating system components and/or device drivers.

The operating system 185, the scheduling device driver 189, and the applications 190 are all composed of pieces of code. A piece of code is an ordered collection of CPU machine instructions having an arbitrary size. A piece of code is executed or run when a single host CPU 110 interprets its instruction in order, one at a time. Each instruction produces a defined change to the state of the processor's internal registers and/or the contents of the host's main memory. Certain instructions can alter the order of execution by changing which instruction will execute next (a transfer of control). Others can cause the CPU 110 to initiate I/O requests. A piece of code can be interrupted in order to allow the CPU to perform other tasks (by running other pieces of code), and then resumed at the point at which it was interrupted. A CPU is always running some piece of code when operating normally.

A process context is the software environment in which a piece of code runs. The process context consists of the mapping between memory addresses in the code and physical memory locations (the address space), the contents of CPU registers, and the execution stack (memory used for temporary storage). When a piece of code is interrupted to allow a CPU 110 to perform other tasks, its context is saved so that it can be restored later before resuming execution of the code. This mechanism allows the code to resume running and proceed as though it had not been interrupted, which can help create the illusion of more than one piece of code executing simultaneously on a single CPU 110. On a host computer 100 having several CPUs 110–110*b*, a piece of code might be executed on one CPU for a while, interrupted, and then resumed on a different CPU without breaking the illusion of continuity. A single host computer may have several process contexts, but there can be only one process context that is active per CPU at a given point in time. This active process context is the software environment for the code currently running on the CPU. A process context is never active on more than one CPU concurrently.

A software component is any discrete piece of code for which there exists defined mechanisms to cause the code to be loaded into system memory 140 and executed by a host CPU 110. Typically a loading mechanism automatically allocates memory for any global variables (for instance state information) that the component defines. A software component instance is a loaded instance of a software component consisting of the component's code and storage for global variables in host memory, accessible in some address space. Typically a particular instance of a software component always runs in a particular process context, but this is not always the case.

An active software component is designed to run in one or more dedicated process contexts. When an active software component is loaded, the loading agent sets up a new process context (which may include a new address space). It initializes this context so the component's code will start running at a predefined main entry point the first time this context becomes active for a host CPU. The newly created process context is then made available to the operating system for scheduling. Each instance of an active software component is autonomous and independent It must synchronize its activities with other software components with which it interacts. An active software component may have code designed to run in several process contexts at the same time (multiple threads of execution). Typically this kind of component's initialization code sets up the additional process contexts and makes them available for running. It is common—though not necessary—for active components to be automatically unloaded when their code finishes executing (i.e. when the CPU reaches the end of the component's code it must transfer control to some piece of system code since there is no more component code to run. This system code can be designed to automatically unload the process instance.)

A passive software component is designed to run periodically in a process context created for some other, active component. Passive software component instances are typically loaded into address spaces created for active components. After initialization, they run only when another component transfers control to them using a call instruction. Typically, passive component instances perform defined tasks each time they are called, and then they return control to the calling component. A passive component can call other passive components. The target of a call is a function (i.e. to transfer control to a piece of code using a call instruction is known as calling a function.) Each function is a piece of code that performs a defined task, and then returns control to the code that executed the call instruction. When control is returned, the calling code continues execution beginning with the first instruction after the call instruction.

The operating system (OS) 185 includes a scheduler 192 that is a piece of code that periodically switches a CPU 110, or CPUs (110–110*b*), between process contexts. This switching (called process scheduling or thread scheduling) ensures that all active software components appear to run smoothly and continuously, with each receiving it fair share of CPU time. The system timer 194 is a device whose purpose is to generate hardware interrupts at regular intervals. Typically, operating systems provide interrupt service routines (ISRs) to handle this interrupt. Generally, the scheduler 192 uses this hardware interrupt to keep track of time and to schedule process contexts to run. Furthermore, a driver clock 196 is utilized by the scheduling driver 189 to keep track of time and is used to determine estimated processing times, as will be discussed. The driver clock 196 is synchronized in lock step with the system timer 194. A timer tick indicates the instant at which the system timer 194 and the driver clock 196 simultaneously generate an interrupt. At each timer tick the system time is updated, and other actions such as process scheduling and the estimation of processing times, can occur. A timer tick interval (TTI) is the period of time between any two adjacent timer ticks (the period of time between when a timer tick occurs and when the following timer tick occurs).

When a piece of code "blocks" it pauses or stalls its execution to wait for some external event (such as I/O completion or a signal from some software component running in a different process context) to occur. Typically, the scheduler 192 will switch the CPU 110 that is running the code to a different process context, and the blocked code will not be scheduled to run again until the external event for which it is waiting has occurred. A blocking call is a call made to a function that can block. A common type of blocking call is blocking system call, which is a system call that can block—usually to wait for device I/O to complete.

A cooperative scheduler only switches a CPU to a different process context when the component that is running in the current context explicitly performs certain actions (such as yielding control, or making a blocking system call). It is called a cooperative scheduler because the software components on the host must cooperate in order to maker sure each gets its fair share of CPU time. A preemptive scheduler switches a CPU to a different process either when the component that is running in the current context explicitly performs certain actions, or when a certain amount of time has elapsed without a context switch. Preemptive schedulers typically run periodically during timer tick processing to determine if a different process context should be running on a particular CPU, and to carry out the context switch if necessary. Operating systems that schedule application process contexts with a preemptive scheduler can give a very convincing illusion of the simultaneous execution of many applications.

When an application 190 sleeps, it explicitly blocks for a specified time interval. Typically, sleep is a blocking system call that does not return control until sometime after the given time interval has elapsed. During this time period, other process contexts can run on the CPU 110 where the sleep call was made. A process context is runnable when it is available to be executed. The scheduler 192 can only choose from the set of runnable process contexts when scheduling CPU time. A process context that has blocked is not runnable until the event for which it is waiting has occurred. For example, a process context that is sleeping will become runnable again after the given time period has elapsed.

One embodiment of the present invention provides a method and apparatus for a scheduling driver 189 to implement a protocol using time estimates such that the scheduling driver 189 is useable with a device 170 that does not generate interrupts. In implementing the present invention within the exemplary environment of FIG. 1, it is assumed that the connected I/O device 170 can only process a single request to a time. As previously described, the I/O device 170 is coupled to the host computer 100 having one or more CPU's (110–110b). Further, the host computer 100 has the operating system 185 loaded into the system memory 140. In one embodiment, the operating system 185 uses a preemptive scheduler to schedule the process contexts in which the applications 190 run. It also provides a mechanism to load applications and make them available to the scheduler 192 for running. The scheduling driver 189 is loaded into the operating system 185 such that the applications 190 can use the scheduling driver 189 to generate I/O requests to the connected device 170. In one embodiment, the scheduling driver 189 is a passive software component and a single instance of the scheduling driver 189 is shared among all the applications 190 that access the device 170.

Even if the host computer 100 has one CPU 110, several process contexts can be positioned in a single driver function simultaneously. Under these circumstances, as each process context is activated to run on the CPU 110, some portion of the scheduling driver 189 function's code is executed. This creates the illusion of the driver function being called by more than one application 190 at a time. Thus, in theory, at a given point in time, an arbitrary number of applications 190 can call the scheduling driver 189 simultaneously to generate device I/O requests. On a host computer 100 with more than one CPU (110–110b) this is literally true, since the driver code can be running on several CPUs simultaneously. The applications 190 that request device I/O from the scheduling driver 189 can be either passive or active software components. The scheduling driver 189 keeps a "locked flag", typically represented by the presence of a particular numerical value at a particular address in system memory 140, to indicate whether or not it has an I/O request in progress. The scheduling driver 189 can examine the state of a device 170 to determine whether a particular I/O request has been completed by the device. The scheduling driver 189 utilizes the driver clock 196 to keep track of passing time.

In one embodiment, the present invention provides a method and apparatus for a scheduling driver 189 to implement a protocol using time estimates such that the scheduling driver 189 is useable with a device 170 that does not generate interrupts. An application 190 calls the scheduling driver 189 to start an Input/Output (I/O) request to a device 170. The scheduling driver 189 determines if the device 170 is busy. If the device is not busy, the scheduling driver 189 provides an estimated processing time (EPT) for the I/O request to be completed to the application.

If the device 170 is busy, the scheduling driver 189 calculates an estimated amount of time left (EATL) until the device 170 will be available to the application 190 and provides this EATL to the application 190. When the device 170 is not busy, the application 190 sleeps for the estimated processing time (EPT) and calls the scheduling driver 189 to obtain the I/O operation results. If the I/O request has been completed, the scheduling driver provides the I/O operation results to the application.

Figure 2:
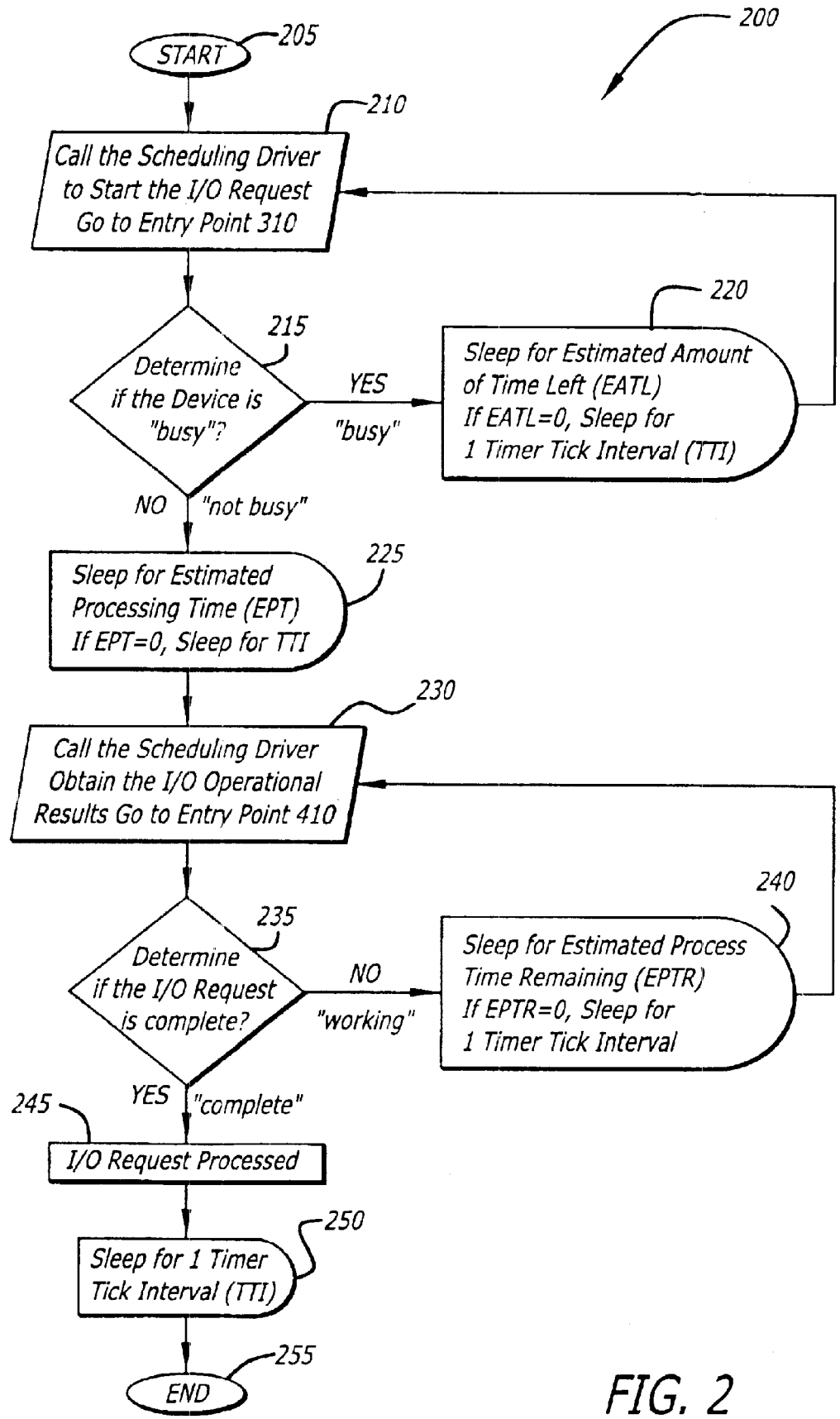
FIG. 2 is a flowchart illustrating a process for an application that interacts with a scheduling driver and utilizes time estimates to carry out an Input/Output (I/O) transaction with a device according to one embodiment of the invention.
Figure 3:
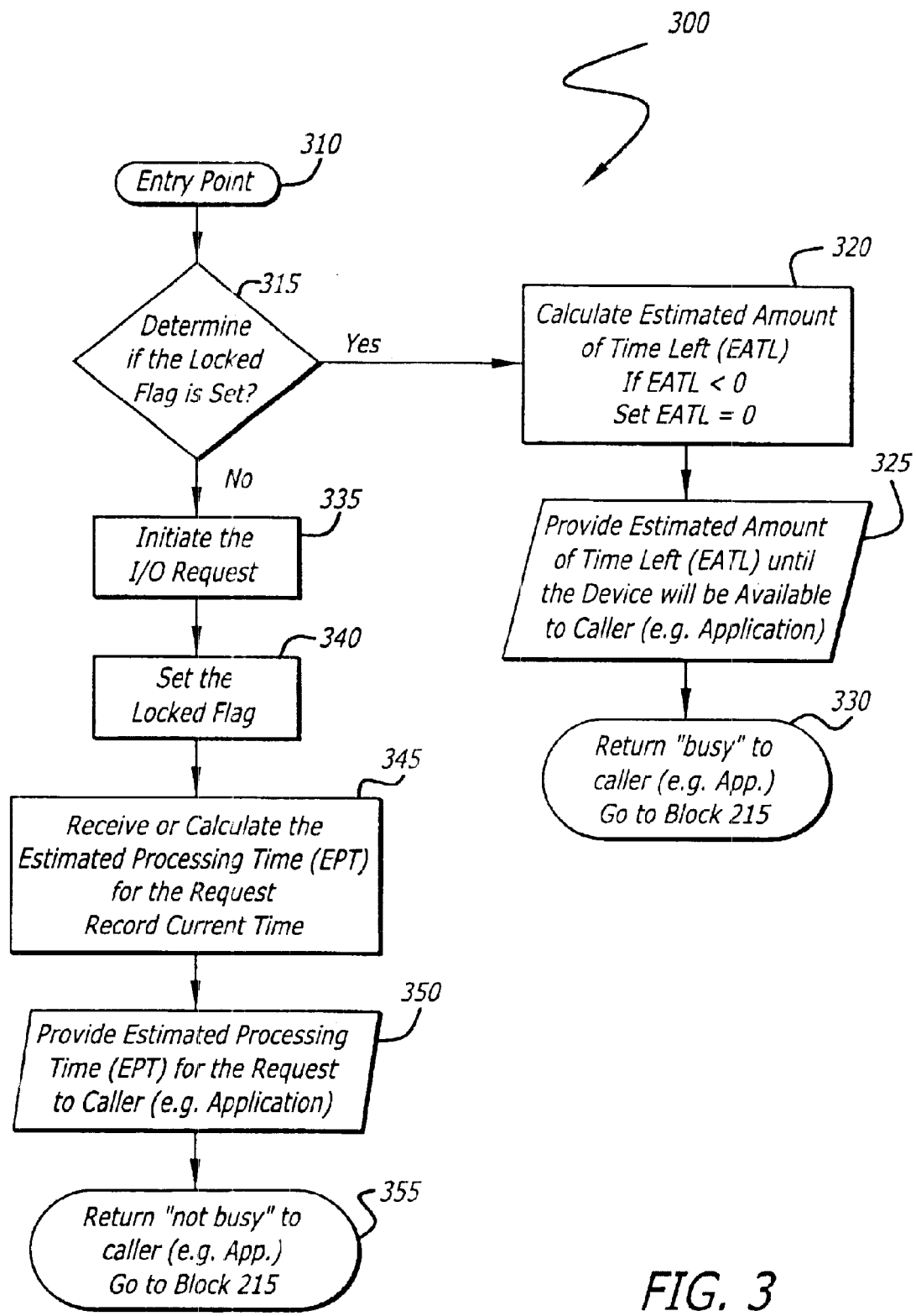
FIG. 3 is a flowchart illustrating a process for the scheduling driver to start an I/O request and to provide an estimated processing time for an I/O transaction to an application according to one embodiment of the invention.
Figure 4:
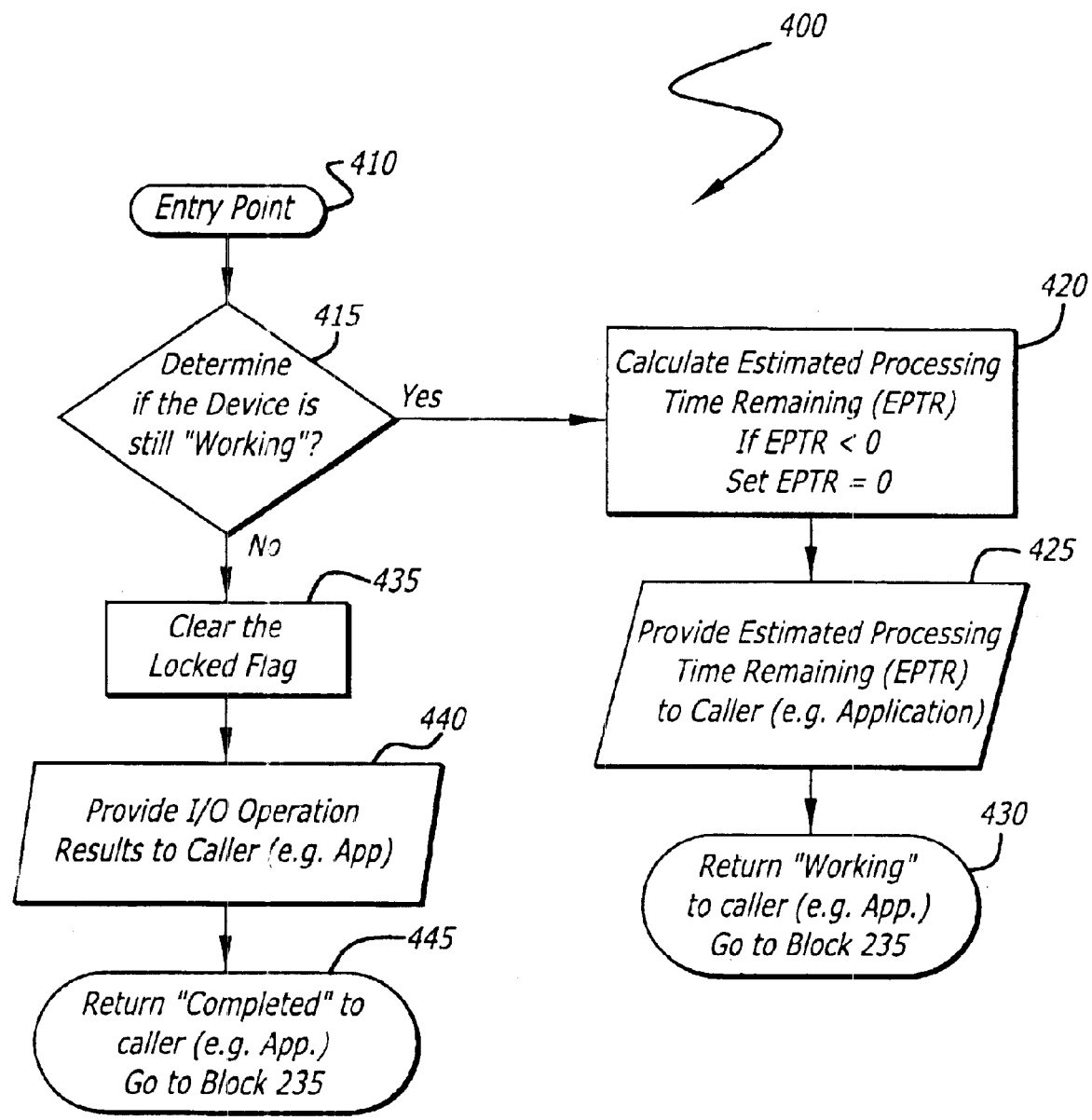
FIG. 4 is a flowchart illustrating a process for the scheduling driver to provide the I/O operation results to the application or an estimated processing time remaining for the I/O transaction to be completed to the application according to one embodiment of the invention.

However, if the I/O request has not been completed, the scheduling driver 189 calculates an estimated processing time remaining (EPTR) for the L/O request to be completed and provides the EPTR to the application 190. The application 190 then sleeps for the estimated processing time remaining (EPTR) and again calls the scheduling driver 189 to obtain the I/O operation results. These operations can be repeated until the I/O request has been completed. Turning to FIGS. 2–4, a more detailed discussion of the interaction between the application 190 and the scheduling driver 189 will be given.

FIG. 2 is a flowchart illustrating a process 200 for an application that interacts with a scheduling driver and utilizes time estimates to carry out an Input/Output (I/O) transaction with a device according to one embodiment of the invention. Upon start (block 205) the process 200 calls the scheduling driver to start the I/O request (block 210). The application makes a call to a process of the scheduling driver to start the I/O request and the process 200 goes to entry point 310 of the process 300 illustrated in FIG. 3 (block 210).

Any number of applications can be concurrently accessing the scheduling driver according to one embodiment of the present invention, at any point in time, to ask that the scheduling driver to generate a device I/O request. However, the device is only capable of processing one request at a time, so that the scheduling driver services only one application's I/O request to a device at a time, while causing the other applications to wait. Thus, each application is served in its turn resulting in a high degree of fairness.

Turning to FIG. 3, FIG. 3 is a flowchart illustrating a process 300 for the scheduling driver to start an I/O request and to provide an estimated processing time for the completion of an I/O transaction to an application, according to one embodiment of the invention. Upon the entry point (block 310), the process 300 determines if the locked flag is set (block 315). If the locked flag is set, the process 300 calculates an estimated amount of time left (EATL) until the device will be free again (block 320). Thus, the device is currently busy servicing another request. The estimated amount of time left (EATL) is calculated by subtracting the elapsed time since the current request being processed was started from the requests original estimated processing time (EPT). If the EATL calculation is negative, the EATL calculation is set to zero (block 320). Next, the process 300 provides the estimated amount of time left (EATL) until the device will be available to the application (block 325). The process 300 then returns a "busy" signal to the process 200 and goes to block 215 of the process 200 illustrated in FIG. 2 (block 330).

On the other hand, if the locked flag is not set, the I/O request is initiated (block 335) and the locked flag is set (block 340). Further, the estimated processing time (EPT) for the I/O request to be completed is determined. In the case that the device itself calculates the estimated processing time (EPT) for the I/O request to be completed, then the process 300 receives this value from the device immediately after initiating the request (block 345). Alternatively, the process 300 can calculate the estimated processing time (EPT) itself (block 345). For example, the scheduler driver may have a table of average EPT's based upon request type and other parameters. Further, the process 300 records the current time at which the request is started (block 345). Next, the process 300 provides the estimated processing time (EPT) for the I/O request to be completed to the application (block 350). The process 300 then returns a "not busy" signal to the process 200 and goes to block 215 of the process 200 illustrated in FIG. 2 (block 355). It should be appreciated that the code for implementing the process 300 for the scheduling driver is a critical section of code and is a piece of code that cannot be reentered. This means that once the code starts running in a process context, it may not be run in any other process context (either on the same CPU or a different CPU) until it finishes running in the original context. Other process contexts that want to enter the code must block until the context that is currently in the code finishes running it.

Returning to FIG. 2, at block 215, the process 200 determines if the device is busy based upon the inputs from the process 300. If the device is "busy", the process 200 causes the application to sleep for the estimated amount of time left (EATL) determined by process 300 (block 220). If the EATL value is set to zero, the application sleeps for one timer tick interval (TTI) (block 220). Further, after sleeping for the designated amount of time, the process 200 starts again from the beginning at block 210.

However, if the device is "not busy", the process 200 causes the application to sleep for the estimated processing time (EPT) from the process 300 (block 225). If the EPT value is set to zero, the application sleeps for one timer tick interval (TTI) (block 225). After sleeping for the designated amount of time, the process 200 calls the scheduling driver to obtain the I/O operation results and the process 200 goes to entry point 410 of process 400 illustrated in FIG. 4 (block 230).

The scheduling driver is the single agent that coordinates timing among applications. Each application sleeps for exactly the time periods specified by the scheduling driver. Any time the driver specifies a zero time interval, the application yields its time slice by sleeping for a timer trick interval (TTI). This lets the operating system scheduler switch the CPU to the next application in line, but the current application remains runnable. Further, the scheduling driver coordinates the sleep times such that, when there are applications sleeping, they will all become runnable on the same timer tick.

FIG. 4 is a flowchart illustrating a process 400 for the scheduling driver to provide the I/O operation results to the application or an estimated processing time remaining for the I/O transaction to be completed to the application according to one embodiment of the invention. Upon the entry point (block 410), the process 400 determines if the device is still busy working on processing the I/O request (block 415). If the device is still busy processing the I/O request, then the process 400 calculates the estimated process time remaining (EPTR) (block 420). The EPTR value is calculated by subtracting the elapsed time since the request was started from its estimated processing time (EPT). If the EPTR value is negative then the EPTR value is set to zero (block 420). Next, the process 400 provides the EPTR value to the application (block 425). The process 400 returns a "working" signal to the process 200 and goes to block 235 of the process 200 illustrated in FIG. 2 (block 430).

On the other hand, if the process 400 has completed the I/O request then the process clears the locked flag (block 435). Next, the process provides the I/O operation results (retrieved from the device) to the application (block 440). The process 400 returns a "complete" signal to the process 200 and goes to block 235 of the process 200 illustrated in FIG. 2 (block 445). As with the code for process 300, the code for implementing the process 400 for the scheduling driver is a critical section of code and is a piece of code that cannot be reentered. At any given time, any number of applications may be waiting for the locked flag to become clear so that they can initiate their request.

Returning to FIG. 2, the process 200 determines if the device is still working based upon the inputs from the process 400. If the device is still working, based upon the receipt of the "working" signal from the process 400, the process 200 causes the application to sleep for the estimated process time remaining (EPTR) (block 240). If the EPTR value is set to zero, then the application sleeps for one timer tick interval (TTI) (block 240). After sleeping for the designated amount of time, the process 200 returns to the block 230 to again call the scheduling driver to try and obtain the I/O operation results (block 230).

However, if the process 400 has completed the I/O request and provided the process 200 with the I/O operation results and returned a "complete" signal to the process 200, the I/O request is processed by the application (block 245). Next, the process 200 causes the application to sleep for one timer tick interval (TTI) before continuing (block 250). This is to permit other waiting applications to run immediately after this application has completed the I/O request, which is necessary to guarantee fairness. The process 200 is then terminated (block 255).

The processes for the interaction of applications with the scheduling driver provide an elegant way for many competing applications to fairly share access to a device that does not generate interrupts. Further, the invention achieves this without causing system performance problems by using an estimate of how long the device will take to complete each request. Since all waiting applications become runnable on the same timer tick, the scheduling driver schedules them in the same order that they would be scheduled if they were all blocked waiting for the device to become available. However, this assumes that the OS scheduler fairly picks the next process context to run from among a group of process contexts that have just become runnable the same time. Thus, the fairness of scheduling driver is also based on the fairness of the process context scheduling by the scheduler of the operating system. For example, the invention works well with multilevel round robin schedulers used by Microsoft Windows operating systems (e.g. Windows 98, windows NT 4.0, Windows 2000) that operate fairly. Generally, the invention is best suited to work with operating systems in which applications generally remain at the same priority level and where a particular priority level runs in round robin order. However, it should be appreciated that the present invention can also work well with a wide variety of operating system schedulers that utilize differing priority schemes.

It should be appreciated that the previously described functional components can be implemented in hardware, software, or a combination of hardware and software. When implemented in software, the elements of the present invention are the code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In particular, in one embodiment of the present invention, the scheduling driver 189 can be generally implemented in the host computer 100 as one or more computer programs, which execute under the control of the operating system 185 to perform the desired functions previously described.

The computer programs are comprised of instructions (e.g. code segments) which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. Under control of the operating system, the computer programs may be loaded from memory, data storage devices, and/or remote devices into the memory of the computer for use during operations.

Thus, the scheduling driver 189 according to one embodiment of the present invention may be implemented as a method, apparatus, or machine-readable medium (e.g. a processor readable medium or a computer readable medium) using standard programming and/or engineering techniques to produce software, firmware, hardware, or any combination thereof. The term "machine readable medium" (or alternatively, "processor readable medium" or "computer readable medium") as used herein is intended to encompass a medium accessible from any machine/process/computer for reading and execution. Of course, those skilled in the art will recognize that many modifications may be made to this configuration without departing from the scope of the present invention.

The processes for the interaction of applications with the scheduling driver, according to one embodiment of the present invention, provide an elegant way for many competing applications to fairly share access to a device that does not generate interrupts. The invention achieves this without causing system performance problems by using an estimate of how long the device will take to complete each request. Further, the invention can work with most operating systems. It does no blocking at all in the scheduling driver—all blocking is done in the application code. Additionally, even though device request synchronization is done in different ways on different operating systems, the processes utilized in the present invention tend to make it very portable.

Also, the present invention elegantly handles the problems created when a device can take a very long time to service a request (several seconds or more), since the application's process context simply remains blocked in a sleep state during the request and the scheduling driver is passive and idle. While the request is being processed, no scheduling driver resources need be owned by any process context, so if a process context is terminated abnormally during a device request, the system is not destabilized. In particular, the code in the scheduling driver's critical sections does not block or poll, allowing these sections to be exited quickly, which is important for system stability, performance, and responsiveness. Further, no polling whatsoever is done in the scheduling driver. Host CPUs are free to perform other tasks during I/O processing.

The application side of the present invention can easily be encapsulated in a library that makes a device request look like a blocking call from the point of view of other application code. Further, the invention uses primitives that are generally available on most operating systems (i.e. sleep, get current system time). The processes of the present invention implemented with the scheduling driver are very fair to competing applications.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    calling a scheduling driver to start an Input/Output (I/O) request to a device for an application, the device being one of a plurality of different types of devices useable by an application, wherein the scheduling driver implements a protocol using time estimates enabling the scheduling driver to be usable with a device that does not generate interrupts;
    determining if the device is busy; and
    if the device is not bus, providing an estimated processing time (EPT) for the I/O request to be completed for the application, wherein the application sleeps for the estimated processing time.

2. The method of claim 1, wherein determining if the device is busy comprises determining whether a locked flag is set, if the locked flag is set the device is busy and if the locked flag is not set the device is not busy.

3. The method of claim 1, further comprising, setting a locked flag if the device is not busy.

4. The method of claim 1, further comprising, calling the scheduling driver to obtain I/O operation results after sleeping for the estimated processing time and determining if the I/O request has been completed.

5. The method of claim 4, further comprising, clearing a locked flag if the I/O request has been completed.

6. The method of claim 4, further comprising, providing the I/O operation results from the I/O request if the I/O request has been completed.

7. The method of claim 4, further comprising, sleeping for a timer tick interval if the I/O request has been completed.

8. The method of claim 4, further comprising, calculating an estimated processing time remaining (EPTR) for the I/O request to be completed, if the I/O request has not been completed, and providing the estimated processing time remaining (EPTR).

9. The method of claim 8, further comprising:
sleeping for the estimated processing time remaining (EPTR);
calling the scheduling driver to obtain the I/O operation results after sleeping for the estimated processing time remaining (EPTR); and
determining if the I/O request has been completed.

10. The method of claim 9, further comprising:
determining if the I/O request has been completed and calculating an estimated processing time remaining (EPTR) for the I/O request to be completed, if the I/O request has not been completed;
sleeping for the estimated processing time remaining (EPTR);
calling the scheduling driver to obtain the I/O operation results after sleeping for the estimated processing time remaining (EPTR); and
if the I/O request has not been completed,
repetitively performing the above operations until the I/O request has been completed.

11. The method of claim 1, further comprising calculating an estimated amount of time left (EATL) until the device will be available if the device is busy, and providing the estimated amount of time left (EATL).

12. The method of claim 11, further comprising:
sleeping for the estimated amount of time left (EATL);
calling the scheduling driver to start the I/O request to the device after sleeping for the estimated amount of time left (EATL); and
determining if the device is still busy.

13. The method of claim 12, further comprising:
determining if the device is still busy and calculating the estimated amount of time left (EATL) until the device will be available, if the device is still busy;
sleeping for the estimated amount of time left (EATL);
calling the scheduling driver to start the I/O request to the device for the application, after sleeping for the estimated amount of time left (EATL); and
if the I/O request has not been started,
repetitively performing the above operations until the I/O request has been started.

14. A method comprising:
calling a scheduling driver to start an Input/Output (I/O) request to a device for an application, the device being one of a plurality of different types of devices useable by an application;
determining if the device is busy; and
if the device is not busy, providing an estimated processing time (EPT) for the I/O request to be completed for the application, wherein the application sleeps for the estimated processing time;
sleeping for a timer tick interval if the I/O request has been completed;
calling the scheduling driver to obtain I/O operation results after sleeping for the estimated processing time and determining if the I/O request has been completed; and
synchronizing a system clock with a clock associated with the scheduling driver, wherein the timer tick indicates an instant where the system clock and scheduling driver clock simultaneously generate an interrupt.

15. A method comprising:
calling a scheduling driver to start an Input/Output (I/O) request to a device for an application, the device being one of a plurality of different types of devices useable by an application;
determining if the device is busy;
if the device is not busy, providing an estimated processing time (EPT) for the I/O request to be completed for the application, wherein the application sleeps for the estimated processing time; and
loading the scheduling driver into an operating system such that applications are capable of generating I/O requests to the device.

16. The method of claim 15, wherein determining if the device is busy comprises determining whether a locked flag is set, if the locked flag is set the device is busy and if the locked flag is not set the device is not busy.

17. The method of claim 15, further comprising, setting a locked flag if the device is not busy.

18. The method of claim 15, further comprising, calling the scheduling driver to obtain I/O operation results after sleeping for the estimated processing time and determining if the I/O request has been completed.

19. The method of claim 18, further comprising, clearing a locked flag if the I/O request has been completed.

20. The method of claim 18, further comprising, providing the I/O operation results from the I/O request if the I/O request has been completed.

21. The method of claim 18, further comprising, sleeping for a timer tick interval if the I/O request has been completed.

22. The method of claim 18, further comprising, calculating an estimated processing time remaining (EPTR) for the I/O request to be completed, if the I/O request has not been completed, and providing the estimated processing time remaining (EPTR).

23. The method of claim 22, further comprising:
sleeping for the estimated processing time remaining (EPTR);
calling the scheduling driver to obtain the I/O operation results after sleeping for the estimated processing time remaining (EPTR); and
determining if the I/O request has been completed.

24. The method of claim 23, further comprising:
determining if the I/O request has been completed and calculating an estimated processing time remaining (EPTR) for the I/O request to be completed, if the I/O request has not been completed;

sleeping for the estimated processing time remaining (EPTR);

calling the scheduling driver to obtain the I/O operation results after sleeping for the estimated processing time remaining (EPTR); and if the I/O request has not been completed, repetitively performing the above operations until the I/O request has been completed.

25. The method of claim 15, further comprising calculating an estimated amount of time left (EATL) until the device will be available if the device is busy, and providing the estimated amount of time left (EATL).

26. The method of claim 25, further comprising:

sleeping for the estimated amount of time left (EATL);

calling the scheduling driver to start the I/O request to the device after sleeping for the estimated amount of time left (EATL); and determining if the device is still busy.

27. The method of claim 26, further comprising:

determining if the device is still busy and calculating the estimated amount of time left (EATL) until the device will be available, if the device is still busy;

sleeping for the estimated amount of time left (EATL);

calling the scheduling driver to start the I/O request to the device for the application, after sleeping for the estimated amount of time left (EATL); and if the I/O request has not been started, repetitively performing the above operations until the I/O request has been started.

28. The method as recited in claim 15, wherein the scheduling driver is a passive software component.

29. The method as recited in claim 15, wherein a single instance of the scheduling driver is shared among a plurality of applications that access the device.

30. A machine-readable medium having stored thereon instructions, which when executed by a machine, causes the machine to perform operations comprising:

calling a scheduling driver to start an Input/Output (I/O) request to a device for an application, the device being one of a plurality of different types useable by an application, wherein the scheduling driver implements a protocol using time estimates enabling the scheduling driver to be usable with a device that does not generate interrupts;

determining if the device is busy; and if the device is not busy, providing an estimated processing time (EPT) for the I/O request to be completed for the application, wherein the application sleeps for the estimated processing time.

31. The machine-readable medium of claim 30, wherein determining if the device is busy comprises determining whether a locked flag is set, if the locked flag is set the device is busy and if the locked flag is not set the device is not busy.

32. The machine-readable medium of claim 30, further comprising the operation of setting a locked flag if the device is not busy.

33. The machine-readable medium of claim 30, further comprising the operations of calling the scheduling driver to obtain I/O operation results after sleeping for the estimated processing time and determining if the I/O request has been completed.

34. The machine-readable medium of claim 33, further comprising the operation of clearing a locked flag if the I/O request has been completed.

35. The machine-readable medium of claim 33, further comprising the operation of providing the I/O operation results from the I/O request if the I/O request has been completed.

36. The machine-readable medium of claim 33, further comprising the operation of sleeping for a timer tick interval if the I/O request has been completed.

37. The machine-readable medium of claim 33, further comprising the operations of calculating an estimated processing time remaining (EPTR) for the I/O request to be completed, if the I/O request has not been completed, and providing the estimated processing time remaining (EPTR).

38. The machine-readable medium of claim 33, further comprising the operations of:

sleeping for the estimated processing time remaining (EPTR);

calling the scheduling driver to obtain the I/O operation results after sleeping for the estimated processing time remaining (EPTR); and determining if the I/O request has been completed.

39. The machine-readable medium of claim 38, further comprising performing the operations of:

determining if the I/O request has been completed and calculating an estimated processing time remaining (EPTR) for the I/O request to be completed, if the I/O request has not been completed;

sleeping for the estimated processing time remaining (EPTR);

calling the scheduling driver to obtain the I/O operation results after sleeping for the estimated processing time remaining (EPTR); and if the I/O request has not been completed, repetitively performing the above operations until the I/O request has been completed.

40. The machine-readable medium of claim 30, further comprising the operations of calculating an estimated amount of time left (EATL) until the device will be available if the device is busy, and providing the estimated amount of time left (EATL).

41. The machine-readable medium of claim 40, further comprising the operations of:

sleeping for the estimated amount of time left (EATL);

calling the scheduling driver to start the I/O request to the device after sleeping for the estimated amount of time left (EATL); and determining if the device is still busy.

42. The machine-readable medium of claim 41, further comprising performing the operations of:

determining if the device is still busy and calculating the estimated amount of time left (EATL) until the device will be available, if the device is still busy;

sleeping for the estimated amount of time left (EATL);

calling the scheduling driver to start the I/O request to the device, after sleeping for the estimated amount of time left (EATL); and if the I/O request has not been started, repetitively performing the above operations until the I/O request has been started.

43. A method comprising:

calling a scheduling driver to start an Input/Output (I/O) request to a device for an application, the device being one of a plurality of different times of devices useable by an application;
determining if the device is busy; and
if the device is not busy, providing an estimated processing time (EPT) for the I/O request to be completed for the application, wherein the application sleeps for the estimated processing time,
where a plurality of applications simultaneously generate device I/O requests.

44. A method comprising:
calling a scheduling driver to start an Input/Output (I/O) request to a device for an application, the device being one of a plurality of different types of devices useable by an application;
determining if the device is busy;
if the device is not busy, providing an estimated processing time (EPT) for the I/O request to be completed for the application, wherein the application sleeps for the estimated processing time;
calling the scheduling driver to obtain I/O operation results after sleeping for the estimated processing time and determining if the I/O request has been completed;
sleeping for a timer tick interval if the I/O request has been completed;
specifying a zero time interval, by the driver;
sleeping for a timer tick interval, thereby yielding a time slice by the application; and
switching, by an operating system scheduler, the CPU to a next application, while allowing the application to remain runnable.

45. A method comprising:
calling a scheduling driver to start an Input/Output (I/O) request to a device for an application, the device being one of a plurality of different types of devices useable by an application;
determining if the device is busy; and
if the device is not busy, providing an estimated processing time (EPT) for the I/O request to be completed for the application, wherein the application sleeps for the estimated processing time,
wherein the scheduling driver does not poll, thereby allowing critical execution sections to be exited quickly.

46. An apparatus comprising:
a processor having a memory connected thereto, the memory storing an application, a scheduling driver, the application calling the scheduling driver to start an Input/Output (I/O) request to a device, the device being one of a plurality of different types of devices useable by an application;
the scheduling driver,
determining if a device is busy; and
if the device is not busy, providing an estimated processing time (EPT) for the I/O request to be completed for the application, wherein the application sleeps for the estimated processing time, wherein the scheduling driver implements a protocol using time estimates enabling the scheduling driver to be usable with a device that does not generate interrupts.

47. The apparatus of claim 46, wherein determining if the device is busy comprises determining whether a locked flag is set, if the locked flag is set the device is busy and if the locked flag is not set the device is not busy.

48. The apparatus of claim 46, wherein the scheduling driver sets a locked flag if the device is not busy.

49. The apparatus of claim 46, wherein the application calls the scheduling driver to obtain I/O operation results after sleeping for the estimated processing time and determines if the I/O request has been completed.

50. The apparatus of claim 49, wherein the scheduling driver clears a locked flag if the I/O request has been completed.

51. The apparatus of claim 46 wherein the scheduling driver provides the I/O operation results from the I/O request to the application if the I/O request has been completed.

52. The apparatus of claim 46 wherein the application sleeps for a timer tick interval if the I/O request has been completed.

53. The apparatus of claim 46 wherein the scheduling driver calculates an estimated processing time remaining (EPTR) for the I/O request to be completed, if the I/O request has not been completed, and provides the estimated processing time remaining (EPTR) to the application.

54. The apparatus of claim 53, wherein the application:
sleeps for the estimated processing time remaining (EPTR);
calls the scheduling driver to obtain the I/O operation results after sleeping for the estimated processing time remaining (EPTR); and
determines if the I/O request has been completed.

55. The apparatus of claim 54, wherein the application:
determines if the I/O request has been completed;
sleeps for the estimated processing time remaining (EPTR) calculated by the scheduling driver;
calls the scheduling driver to obtain the I/O operation results after sleeping for the estimated processing time remaining (EPTR); and
if the I/O request has not been completed,
repetitively performing the above operations until the I/O request has been completed.

56. The apparatus of claim 46, wherein the scheduling driver calculates an estimated amount of time left (EATL) until the device will be available to the application if the device is busy, and provides the estimated amount of time left (EATL) to the application.

57. The apparatus of claim 56, wherein the application:
sleeps for the estimated amount of time left (EATL);
calls the scheduling driver to start the I/O request to the device for the application after sleeping for the estimated amount of time left (EATL); and
determines if the device is still busy.

58. The apparatus of claim 57, wherein the application:
determines if the device is still busy;
sleeps for the estimated amount of time left (EATL) calculated by the scheduling driver;
calls the scheduling driver to start the I/O request to the device for the application, after sleeping for the estimated amount of time left (EATL); and
if the I/O request has not been started,
repetitively performing the above operations until the I/O request has been started.

59. An apparatus comprising:
a processor having a memory connected thereto, the memory storing an application, a scheduling driver, the application calling the scheduling driver to start an Input/Output (I/O) request to a device, the device being one of a plurality of different types of devices useable by an application;
the scheduling driver, determining if a device is busy; and
if the device is not busy, providing an estimated processing time (EPT) for the I/O request to be completed for the application, wherein the application sleeps for the estimated processing time,
wherein the application sleeps for a timer tick interval if the I/O request has been completed, and
wherein a system clock is synchronized with a clock associated with the scheduling driver, wherein the timer tick indicates an instant where the system clock and scheduling driver clock simultaneously generate an interrupt.

60. An apparatus comprising:
a processor having a memory connected thereto, the memory storing an application, a scheduling driver, the application calling the scheduling driver to start an Input/Output (I/O) request to a device, the device being one of a plurality of different types of devices useable by an application;
the scheduling driver,
determining if a device is busy; and
if the device is not busy, providing an estimated processing time (EPT) for the I/O request to be completed for the application, wherein the application sleeps for the estimated processing time,
wherein the scheduling driver is loaded into an operating system such that applications are capable of generating I/O requests to the device.

61. The apparatus as recited in claim 60, wherein the scheduling driver is a passive software component.

62. The apparatus as recited in claim 60, wherein a single instance of the scheduling driver is shared among a plurality of applications that access the device.

63. The apparatus of claim 60, wherein determining if the device is busy comprises determining whether a locked flag is set, if the locked flag is set the device is busy and if the locked flag is not set the device is not busy.

64. The apparatus of claim 60, wherein the scheduling driver sets a locked flag if the device is not busy.

65. The apparatus of claim 60, wherein the application calls the scheduling driver to obtain I/O operation results after sleeping for the estimated processing time and determines if the I/O request has been completed.

66. The apparatus of claim 65, wherein the scheduling driver clears a locked flag if the I/O request has been completed.

67. The apparatus of claim 60, wherein the scheduling driver provides the I/O operation results from the I/O request to the application if the I/O request has been completed.

68. The apparatus of claim 60, wherein the application sleeps for a timer tick interval if the I/O request has been completed.

69. The apparatus of claim 60, if wherein the scheduling driver calculates an estimated processing time remaining (EPTR) for the I/O request to be completed, if the I/O request has not been completed, and provides the estimated processing time remaining (EPTR) to the application.

70. The apparatus of claim 69, wherein the application:
sleeps for the estimated processing time remaining (EPTR);
calls the scheduling driver to obtain the I/O operation results after sleeping for the estimated processing time remaining (EPTR); and
determines if the I/O request has been completed.

71. The apparatus of claim 70, wherein the application:
determines if the I/O request has been completed;
sleeps for the estimated processing time remaining (EPTR) calculated by the scheduling driver;
calls the scheduling driver to obtain the I/O operation results after sleeping for the estimated processing time remaining (EPTR); and
if the I/O request has not been completed,
repetitively performing the above operations until the I/O request has been completed.

72. The apparatus of claim 60, wherein the scheduling driver calculates an estimated amount of time left (EATL) until the device will be available to the application if the device is busy, and provides the estimated amount of time left (EATL) to the application.

73. The apparatus of claim 72, wherein the application:
sleeps for the estimated amount of time left (EATL);
calls the scheduling driver to start the I/O request to the device for the application after sleeping for the estimated amount of time left (EATL); and
determines if the device is still busy.

74. The apparatus of claim 73, wherein the application:
determines if the device is still busy;
sleeps for the estimated amount of time left (EATL) calculated by the scheduling driver;
calls the scheduling driver to start the I/O request to the device for the application, after sleeping for the estimated amount of time left (EATL); and
if the I/O request has not been started,
repetitively performing the above operations until the I/O request has been started.

75. An apparatus comprising:
a processor having a memory connected thereto, the memory storing an application, a scheduling driver, the application calling the scheduling driver to start an Input/Output (I/O) request to a device, the device being one of a plurality of different types of devices useable by an application;
the scheduling driver,
determining if a device is busy; and
if the device is not busy, providing an estimated processing time (EPT) for the I/O request to be completed for the application,
wherein the application sleeps for the estimated processing time, and
where a plurality of applications simultaneously generate device I/O requests.

76. An apparatus comprising:
a processor having a memory connected thereto, the memory storing an application, a scheduling driver, the application calling the scheduling driver to start an Input/Output (I/O) request to a device, the device being one of a plurality of different types of devices useable by an application;
the scheduling driver,
determining if a device is busy; and
if the device is not busy, providing an estimated processing time (EPT) for the I/O request to be completed for the application,
wherein the application sleeps for the estimated processing time,
wherein the application sleeps for a timer tick interval if the I/O request has been completed, and
wherein if the scheduling driver specifies a zero time interval, the application sleeps for a timer tick interval, thereby yielding a time slice by the application, and an operating system scheduler switches to a next application, while allowing the application to remain runnable.

77. An apparatus comprising:

a processor having a memory connected thereto, the memory storing an application, a scheduling driver, the application calling the scheduling driver to start an Input/Output (I/O) request to a device, the device being one of a plurality of different types of devices useable by an application;

the scheduling driver, determining if a device is busy; and if the device is not busy, providing an estimated processing time (EPT) for the I/O request to be completed for the application, wherein the application sleeps for the estimated processing time, wherein the scheduling driver does not poll, thereby allowing critical execution sections to be exited quickly.

* * * * *

UNITED STATES PATENT AND TRADEMARK OFFICE
CERTIFICATE OF CORRECTION

PATENT NO. : 6,795,873 B1
DATED : September 21, 2004
INVENTOR(S) : Barth et al.

It is certified that error appears in the above-identified patent and that said Letters Patent is hereby corrected as shown below:

Column 8,
Line 43, delete "L/O" and insert -- I/O --.

Column 12,
Line 66, delete "bus" and insert -- busy --.

Column 17,
Line 1, delete "times" and insert -- types --.

Column 19,
Line 54, delete "if".

Signed and Sealed this

Tenth Day of May, 2005

JON W. DUDAS
*Director of the United States Patent and Trademark Office*